US012674479B2

(12) United States Patent
Takahashi et al.

(10) Patent No.: US 12,674,479 B2
(45) Date of Patent: Jul. 7, 2026

(54) CLIP MEMBER

(71) Applicant: YKK CORPORATION, Tokyo (JP)

(72) Inventors: Yuya Takahashi, Tokyo (JP); Takefumi Adachi, Tokyo (JP); Yasunari Sogabe, Tokyo (JP); Zhiyu Ren, Kurobe (JP)

(73) Assignee: YKK CORPORATION, Tokyo (JP)

( * ) Notice: Subject to any disclaimer, the term of this patent is extended or adjusted under 35 U.S.C. 154(b) by 0 days.

(21) Appl. No.: 18/711,448

(22) PCT Filed: Oct. 12, 2022

(86) PCT No.: PCT/JP2022/038099
§ 371 (c)(1),
(2) Date: May 17, 2024

(87) PCT Pub. No.: WO2023/089993
PCT Pub. Date: May 25, 2023

(65) Prior Publication Data
US 2025/0020148 A1 Jan. 16, 2025

(30) Foreign Application Priority Data

Nov. 19, 2021 (JP) ................................. 2021-188761

(51) Int. Cl.
*F16B 2/22* (2006.01)
*B68G 7/05* (2006.01)

(52) U.S. Cl.
CPC . *F16B 2/22* (2013.01); *B68G 7/05* (2013.01)

(58) Field of Classification Search
CPC .......... F16B 2/22; F16B 5/0635; F16B 5/121; B68G 7/05; B60N 2/5825; B60N 2/6027;
(Continued)

(56) References Cited

U.S. PATENT DOCUMENTS 4,691,416 A 9/1987 Nakayama et al.
5,833,064 A 11/1998 Ayres et al.
(Continued)

FOREIGN PATENT DOCUMENTS

CN 107252214 A 10/2017
CN 112004443 A 11/2020
(Continued)

OTHER PUBLICATIONS

Takahashi, Yuya; International Search Report and Written Opinion for PCT/JP2022/038099, filed Oct. 12, 2022, mailed Dec. 13, 2022, 9 pgs.
(Continued)

*Primary Examiner* — Kimberly T Wood
(74) *Attorney, Agent, or Firm* — Meunier Carlin & Curfman LLC

(57) ABSTRACT

A clip member includes a hook engageable with a peripheral portion and a fixing portion configured to penetrate through an adherend to fix the adherend. The hook includes a base piece, an end piece provided at a first side with respect to the base piece; and a connecting piece connecting the base piece and the end piece. The fixing portion includes a base end continuous with the base piece and protrudes toward a second side with respect to the base piece.

9 Claims, 12 Drawing Sheets

(58) Field of Classification Search
CPC .. B60N 2/6009; B60N 2/5891; B60N 2/6018; A47C 31/023
USPC ............ 297/218.1, 218.2, 218.3, 218.5, 227, 297/228.13
See application file for complete search history.

(56) References Cited

U.S. PATENT DOCUMENTS

| | | | |
|---|---|---|---|
| 6,048,025 A | 4/2000 | Tillner | |
| 2006/0113751 A1* | 6/2006 | Tracht ................. | B60R 21/2176 280/728.2 |
| 2011/0017421 A1* | 1/2011 | Esaki ................... | B60N 2/5635 165/41 |
| 2012/0272483 A1 | 11/2012 | Moore | |
| 2014/0096346 A1 | 4/2014 | Conway et al. | |
| 2015/0164239 A1 | 6/2015 | Conway et al. | |
| 2021/0137279 A1 | 5/2021 | Nanbu et al. | |
| 2022/0153172 A1 | 5/2022 | Sumoto et al. | |

FOREIGN PATENT DOCUMENTS

| | | | | | |
|---|---|---|---|---|---|
| DE | 2626748 | A | * | 12/1977 | |
| DE | 29804603 | U1 | * | 7/1999 | .......... A47C 31/026 |
| DE | 102005013613 | A1 | * | 9/2006 | ............ B60N 2/986 |
| DE | 202017106324 | U1 | * | 5/2018 | ............ A47C 31/02 |
| JP | S53-23404 | U1 | | 2/1978 | |
| JP | 2018001438 | | | 1/2018 | |
| JP | 2018114863 | A | | 7/2018 | |
| JP | 2020203565 | A | | 12/2020 | |
| WO | WO-2012104551 | A1 | * | 8/2012 | .......... A47C 31/023 |

OTHER PUBLICATIONS

Takahashi, Yuya; International Preliminary Report on Patentability for PCT/JP2022/038099, filed Oct. 12, 2022, mailed May 2, 2024, 5 pgs.
Office Action issued for the corresponding Chinese patent application No. 202280076582.4 on Mar. 30, 2026.

* cited by examiner

F I G . 5
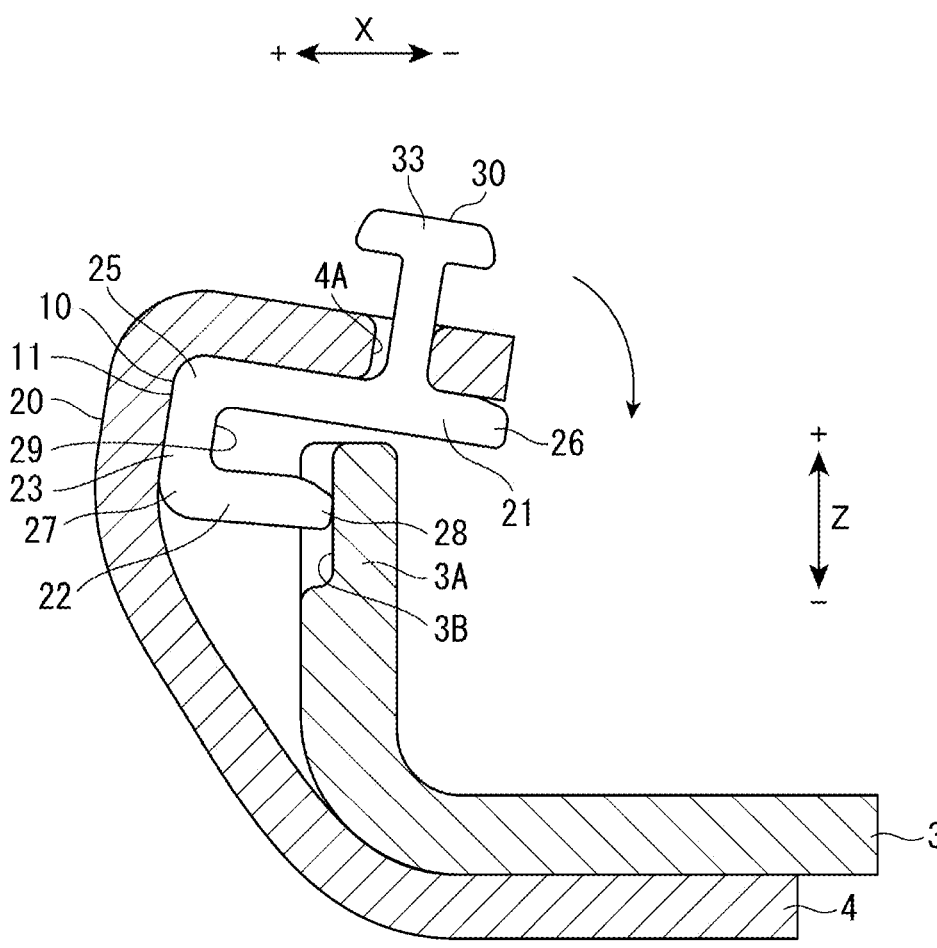

CLIP MEMBER

TECHNICAL FIELD

The present invention relates to a clip member for attaching an adherend (e.g. a cover material) to a peripheral portion of various structural components such as a cover of a console box and an armrest installed in a vehicle such as an automobile.

BACKGROUND ART

The above-described adherend such as a cover material attached to a peripheral portion of various structural components, which is typically attached using a tacker or through welding, requires considerable workload for the attachment work of the adherend. In view of the above, it has been proposed to reduce the workload for the above-described attachment work of the adherend using a clip member.

For instance, it is proposed in Patent Literature 1 to attach a cover material to a peripheral portion of a core material of an armrest of a vehicle door using a rail member (clip member).

CITATION LIST

Patent Literature(s)

Patent Literature 1: JP 2018-114863 A

SUMMARY OF THE INVENTION

Problem(s) to be Solved by the Invention

The rail member disclosed in Patent Literature 1 is a cross-sectionally U-shaped component made of a soft resin and provided with a long leg and a short leg, where the cover material, which is attached to the long leg by sewing, is attached to the peripheral portion of the core material by being fitted inside the peripheral portion.

Meanwhile, the cover material is attached to the long leg of the rail member disclosed in Patent Literature 1 by sewing, which requires considerable workload for attaching the cover material onto the rail member. In addition, it also requires considerable workload to attach the clip member (e.g. a rail member) to the adherend such as a cover material by sewing.

An object of the invention is to provide a clip member to be attachable to an adherend with a reduced workload.

Means for Solving the Problem(s)

A clip member according to an aspect of the invention is a clip member for attaching an adherend to a peripheral portion of a structural component, the clip member including: a hook engageable with the peripheral portion; and a fixing portion configured to penetrate through the adherend to fix the adherend, in which the hook includes a base piece, an end piece provided at a first side with respect to the base piece, and a connecting piece connecting the base piece and the end piece, and the fixing portion includes a base end continuous with the base piece and protrudes toward a second side with respect to the base piece.

With the clip member according to the aspect of the invention, since the fixing portion, which protrudes from the base piece and penetrates through the adherend, fixes the adherend, it is not necessary to attach the adherend to the clip member by sewing, so that the workload for the attachment work of the adherend to the clip member can be reduced.

Further, as compared with an instance where the adherend is attached to the clip member by sewing, with the hook being engaged with the peripheral portion of the structural component, the position of the adherend fixed to the fixing portion is mechanically determined, so that the adherend can be attached to the peripheral portion of the structural component as desired.

Furthermore, the adherend can be attached to the peripheral portion of the structural component by engaging the hook, which is provided with the end piece at a side opposite the fixing portion, with the peripheral portion of the structural component. Accordingly, it is not necessary to form a protrusion or the like, where the adherend is attached, on the peripheral portion per se of the structural component.

In the clip member according to the above aspect of the invention, the fixing portion optionally includes a protrusion in a form of an extension at a leading end opposite the base end.

In the above arrangement, the protrusion is formed at the leading end of the fixing portion. Accordingly, when the hook is engaged with the peripheral portion of the structural component and even when the adherend (e.g. a cover material) fixed to the fixing portion is pulled to be possibly detached from the fixing portion, the protrusion is engaged with the adherend to serve as a retainer. Accordingly, the adherend can be more stably fixed to the fixing portion.

In the clip member according to the above aspect of the invention, the fixing portion optionally protrudes toward the second side from the base piece and extends along the base piece, the base end of the fixing portion and a free end of the base piece define therebetween a step portion in which the adherend is placeable, the fixing portion further includes: a leading end extending along the base piece; and a retainer claw provided at the leading end and facing the free end of the base piece in a manner spaced apart from the free end in a direction along the base piece. According to the above arrangement, when the fixing portion penetrates through the adherend, the adherend is engaged with the step portion. Even when the engagement of the adherend with the step portion is loosened, the retainer claw is engaged with the adherend to prevent the adherend from being detached from the fixing portion. While the adherend is attached to the structural component, since the free end of the base piece and the retainer claw of the fixing portion are arranged along the structural component with the adherend being engaged with the step portion, the adherend is fixed by the fixing portion.

In the clip member according to the above aspect of the invention, the step portion is optionally defined as a concave portion formed between the base end of the fixing portion and the free end of the base piece.

According to the above arrangement, as compared with a clip member having, for instance, a simple flat step portion between the free end of the base piece and the base end of the fixing portion, the position of the adherend can be restrained from being shifted since the adherend is placed in the concave portion.

In the clip member according to the above aspect of the invention, the concave portion is optionally tapered from an opening to a bottom thereof.

According to the above arrangement, when a tensile force is applied on the adherend after the adherend is attached to the structural component, the adherend is fitted into the tapered concave portion. Accordingly, the position of the adherend is further unlikely to be shifted and also is unlikely to be dropped off from the fixing portion.

In the clip member according to the above aspect of the invention, the fixing portion optionally protrudes toward the second side with respect to the base piece and extends along the base piece, and a part of the fixing portion near a leading end with respect to the base end optionally faces the base piece in a manner spaced apart from the base piece in a direction orthogonal to the direction along the base piece.

According to the above arrangement, when the fixing portion penetrates through the adherend, the adherend is hooked to the base end of the fixing portion and is held between the fixing portion and the base piece. Thus, the adherend, which is kept being hooked to the base end of the fixing portion, is firmly fixed and kept being fixed to the fixing portion once being applied with a tensile force after the adherend is attached to the structural component.

In the clip member according to the above aspect of the invention, the part of the base piece facing the fixing portion in the direction orthogonal to the direction along the base piece is optionally thinner than other parts of the base piece.

According to the above arrangement, the fixing portion can be provided close to the base piece, so that the size of the clip member can be reduced and, consequently, the possibility of interference with other components can be reduced.

In the clip member according to the above aspect of the invention, optionally, the base piece further includes a connection end connected to the connecting piece, and a dimension of the base piece from the connection end to the free end is larger than a dimension from a connection end of the end piece connected to the connecting piece to a free end of the end piece, and a base end of the fixing portion is located between a position of the free end of the base piece and a position of the free end of the end piece.

According to the above arrangement, when the adherend (e.g. a cover material) fixed on the fixing portion is pulled after the hook is engaged with the peripheral portion of the structural component, the base end of the fixing portion is located between the position of the free end of the base piece and the position of the free end of the end piece. Accordingly, as compared with an instance where the base end of the fixing portion is located between the position of the free end of the end piece and the position of the connection end of the base piece, the hook is more unlikely to be detached from the peripheral portion of the structural component, so that the adherend can be suitably attached to the peripheral portion of the structural component with the use of the clip member.

A clip member according to another aspect of the invention is a clip member for attaching an adherend to a peripheral portion of a structural component, the clip member including: a hook engageable with the peripheral portion; and a fixing portion configured to penetrate through the adherend to fix the adherend, in which the hook includes a base piece, an end piece provided facing the base piece, and a connecting piece connecting the base piece and the end piece, the fixing portion includes a base that is continuous with an end of the base piece opposite a connection end connected with the connecting piece and extends along the base piece, and an end portion continuous with the base, and the fixing portion further includes a pair of concave grooves each defined by a pair of lateral portions and a bottom portion, the respective lateral portions being defined by the end and the end portion, the bottom portion being defined by the base.

With the use of the clip member according to the above aspect of the invention, since the adherend can be fitted in the pair of concave grooves by inserting the fixing portion through the adherend, it is not necessary to attach the adherend to the clip member by sewing, so that the workload for an attachment work of the adherend on the clip member can be reduced.

Further, as compared with an instance where the adherend is attached to the clip member by sewing, with the hook being engaged with the peripheral portion of the structural component, the position of the adherend fixed to the fixing portion is mechanically determined, so that the adherend can be attached to the peripheral portion of the structural component as desired.

Furthermore, the adherend can be attached to the peripheral portion of the structural component by engaging the hook, which is provided with the end piece at a side opposite the fixing portion, with the peripheral portion of the structural component. Accordingly, it is not necessary to form a protrusion or the like, where the adherend is attached, on the peripheral portion per se of the structural component.

In addition, since the fixing portion extends along the base piece, as compared with, for instance, a clip member having a fixing portion protruding toward a second side opposite a first side, provided that a side of the end piece with respect to the base piece is defined as the first side, the structure can be simplified by omitting the structure protruding toward the second side and a possibility for the clip member to be interfered with other components can be reduced.

In the clip member according to the above aspect of the invention, the fixing portion including the pair of concave grooves is optionally in a form of an arrowhead.

According to the above arrangement, the fixing portion can be more easily inserted through the adherend.

The clip member according to the above aspect of the invention optionally further includes: at least two clip portions each including the hook and the fixing portion; and a flexible connecting portion connecting the at least two clip portions, and the connecting portion connects parts of the hooks of the at least two clip portions.

According to the above arrangement, the two clip portions connected by the connecting portion can reduce the workload for attaching the clip member onto the adherend as compared with, for instance, an attachment work for attaching an adherend by fixing the adherend on the fixing portion of two separate clip members and engaging the hook with a peripheral portion of a structural component.

Further, since parts of the hooks of two clip portions are connected by the flexible connecting portion, even when, for instance, the peripheral portion of the structural component is curved, the clip member can be attached to follow the curved profile of the peripheral portion.

In the clip member according to the above aspect of the invention, the connecting portion optionally connects the connecting pieces.

According to the above arrangement, as compared with, for instance, a clip member whose connection ends of the base pieces connected to the connecting pieces are connected by the connecting portion and a clip member whose connection ends of the end pieces connected to the connecting pieces are connected by the connecting portion, flexibility of the connecting portion can be enhanced and the hook can be easily pushed onto the peripheral portion of the structural component when being engaged with the peripheral portion. Further, even when the hook is engaged with the peripheral portion of the structural component to apply a tension on the adherend, since the connecting pieces are connected by the connecting portion, the adherend can be kept from biting into between the connecting pieces to be wrinkled, so that the appearance of the adherend attached on the peripheral portion of the structural component can be improved.

In the clip member according to the above aspect of the invention, the connecting portion optionally connects connection ends of the respective base pieces connected to the connecting pieces or connects connection ends of the respective end pieces connected to the connecting pieces.

According to the above arrangement, as compared with the connecting pieces connected by the connecting portion, an appropriate hardness can be provided to the connecting portion. For instance, when the connection ends of the base pieces to the connecting pieces are connected by the connecting portion, while parts of the clip portion near the end piece are easily bent toward each other, parts of the clip portion near the base piece are not easily bent toward each other. On the other hand, when the connection ends of the end piece connected to the connecting piece are connected by the connecting portion, while parts of the clip portion near the base piece are easily bent toward each other, parts of the clip portion near the end piece are not easily bent toward each other. Accordingly, a clip member that fits to a curved profile or the like of a peripheral portion of a structural component can be provided.

Further, even when the hook is engaged with the peripheral portion of the structural component to apply a tension on the adherend, since the connection ends are connected by the connecting portion, the adherend can be kept from biting into between the connection ends to be wrinkled, so that the appearance of the adherend attached on the peripheral portion of the structural component can be improved.

An object of the invention is to provide a clip member to be attachable to an adherend with a reduced workload.

BRIEF DESCRIPTION OF DRAWINGS

FIG. 5 is another illustration explaining the attachment process of the clip member according to the first exemplary embodiment.

DESCRIPTION OF EMBODIMENT(S)

First Exemplary Embodiment

A first exemplary embodiment of the invention will be described below with reference to attached drawings.

Figure 1:
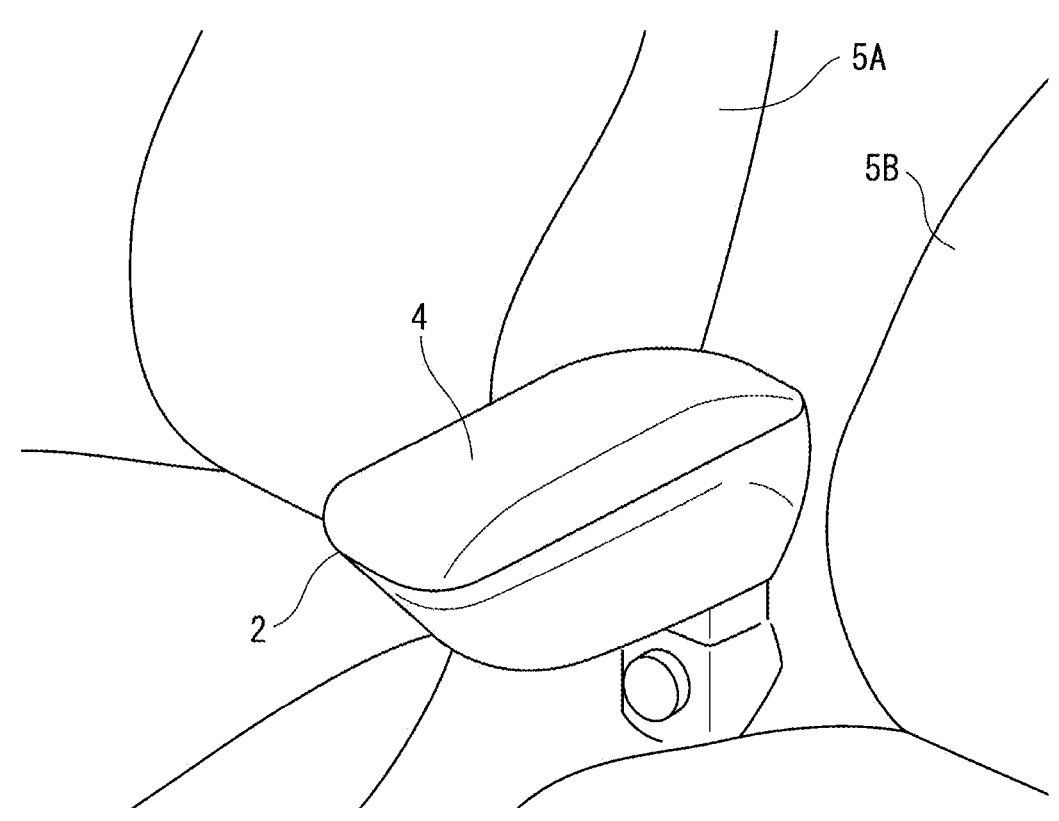
FIG. 1 is a perspective view depicting a console box installed in an interior of an automobile.

A clip member 10 according to the first exemplary embodiment is usable for attaching a cover material 4 (adherend) to a peripheral portion 3A (see FIG. 2) of a cover body 3 of a console box 2 (structural component) depicted in FIG. 1. The console box 2 is installed in an interior of an automobile; exemplarily installed between seats 5A, 5B in FIG. 1. The peripheral portion 3A in the first exemplary embodiment is an edge periphery of a flange formed at a circumference of the cover body 3. Though omitted in the drawings, the cover material 4, which is provided with a skin material on a top side and a cushion material on a back side, is compressible in a thickness direction thereof. The cover material 4 covers an outer surface of the cover body 3 with being attached to the peripheral portion 3A of the cover body 3.

In the description below, an X direction is defined by a right-left direction (width direction) with respect to the clip member 10 attached, a Y direction orthogonal to the X direction is a longitudinal direction with respect to the clip member 10 attached, and a Z direction orthogonal to the X and Y directions is a top-bottom direction with respect to the clip member 10 attached.

Figure 2:
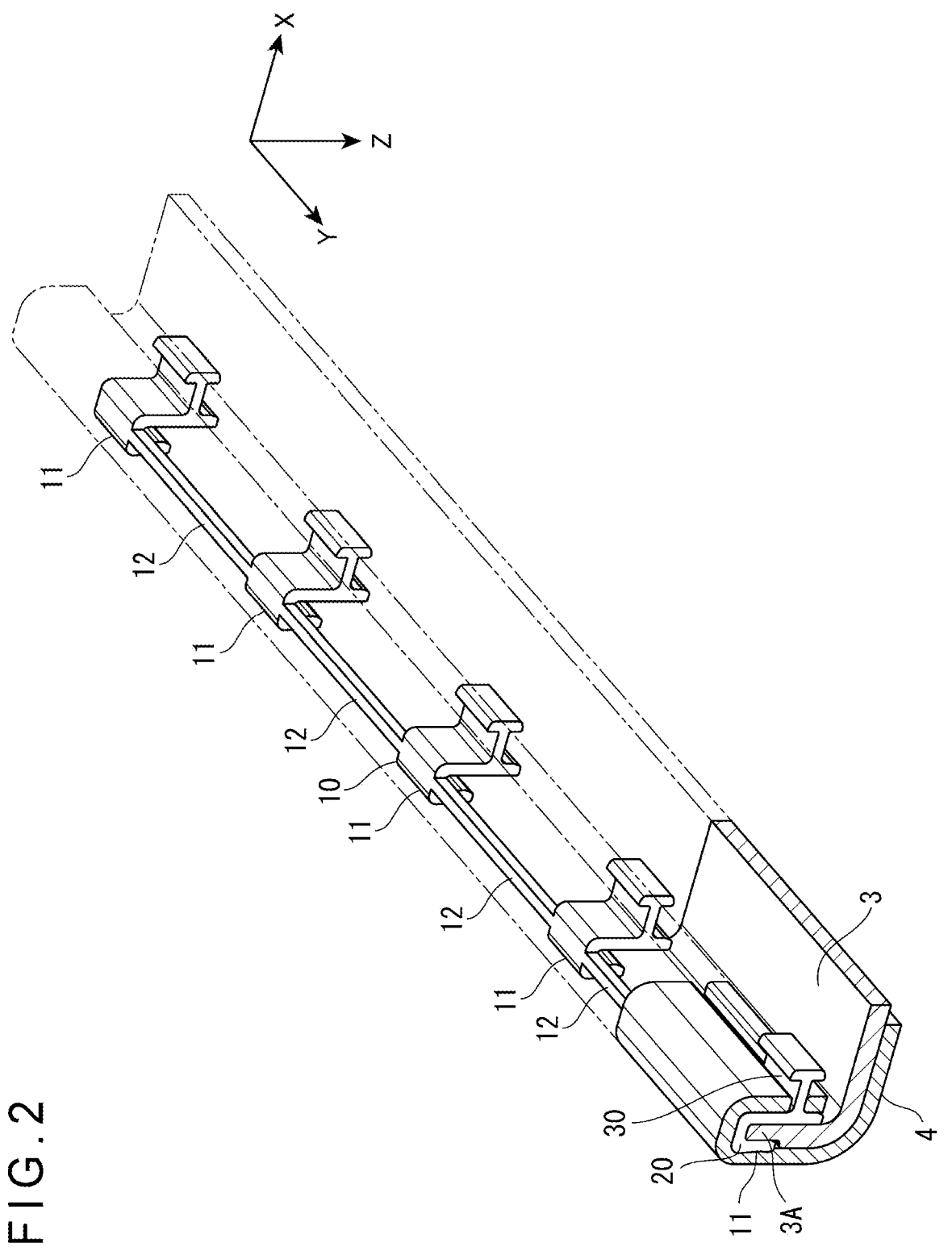
FIG. 2 is a perspective view depicting a clip member according to a first exemplary embodiment of the invention.

The clip member 10, which is a component made of a synthetic resin, includes at least two (five in the first exemplary embodiment as shown in FIG. 2) clip portions 11 and flexible connecting portions 12 integrally connecting the clip portions 11 in the Y direction.

Figure 3:
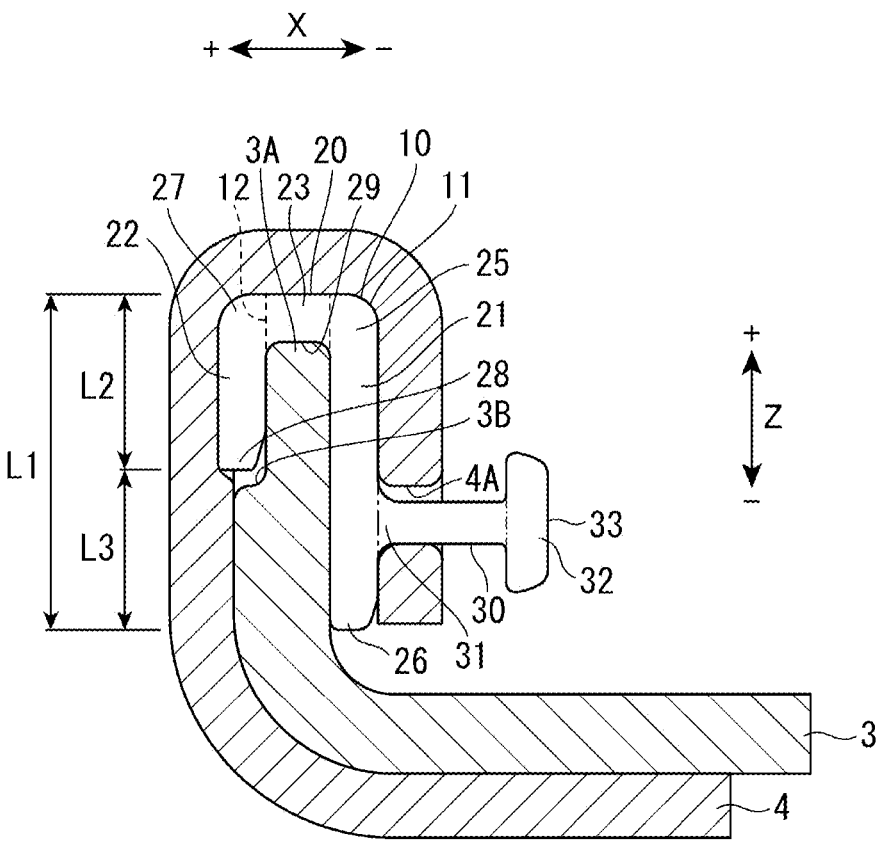
FIG. 3 is a cross-sectional view depicting the clip member according to the first exemplary embodiment.

As shown in FIG. 3, each of the clip portions 11 includes a hook 20 to be engaged with the peripheral portion 3A and a fixing portion 30 to fix the cover material 4 by penetrating through the cover material 4.

The hook 20 includes a base piece 21 extending in the Z direction, an end piece 22 provided at a +X direction-side (first side) with respect to the base piece 21 and extending along the Z direction, and a connecting piece 23 extending along the X direction and connecting the base piece 21 and the end piece 22.

The base piece 21 includes: a connection end 25 connected with the connecting piece 23; and a free end 26. The connection end 25 is an end in the +Z direction of the base piece 21. The free end 26 is an end (leading end) in the −Z direction of the base piece 21. The end piece 22 includes: a connection end 27 connected with the connecting piece 23; and a free end 28. The connection end 27 is an end in the +Z direction of the end piece 22. The free end 28 is an end (leading end) in the −Z direction of the end piece 22.

Figure 4:
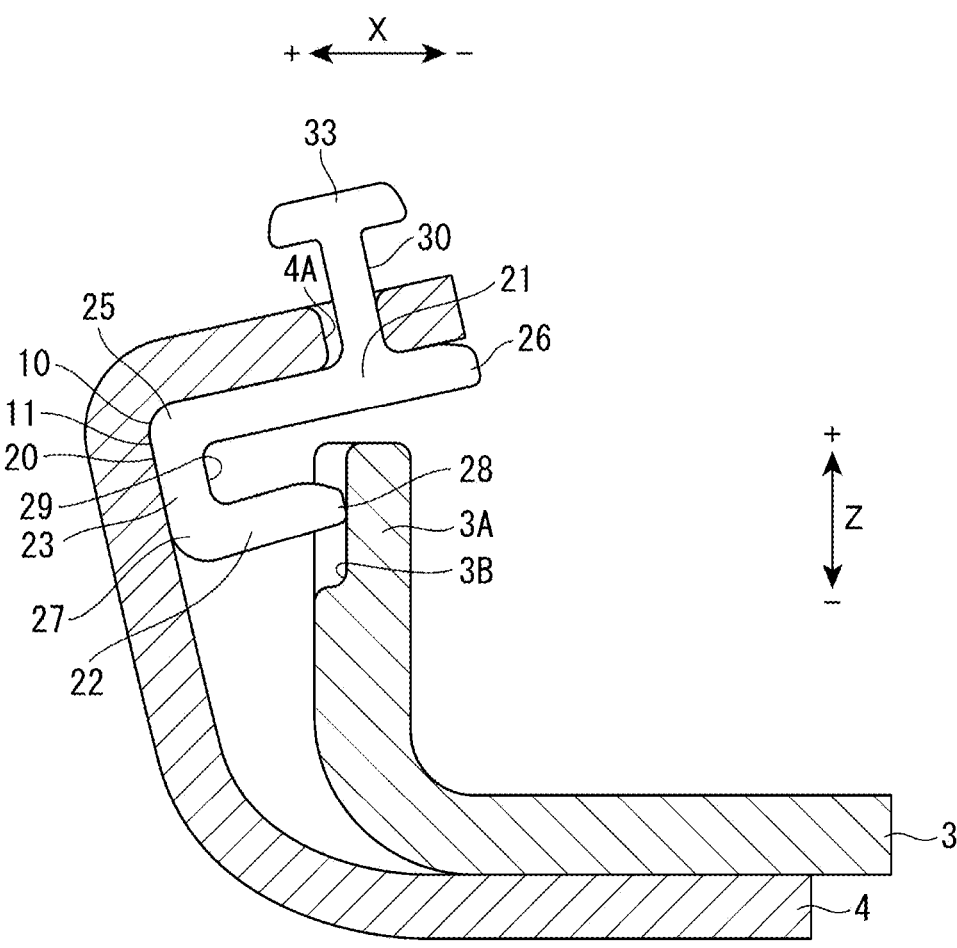
FIG. 4 is an illustration explaining an attachment process of the clip member according to the first exemplary embodiment.

A hooking groove 29, in which the peripheral portion 3A is placed, is defined by inner surfaces of the base piece 21, the end piece 22, and the connecting piece 23, where each of the base piece 21, the end piece 22, and the connecting piece 23 is slightly flexible. Accordingly, as depicted in FIGS. 4 and 5, when the hook 20 is engaged with the peripheral portion 3A to place the peripheral portion 3A in the hooking groove 29 as depicted in FIG. 3, slight flexibility of the base piece 21, the end piece 22, and the connecting piece 23 makes it smooth to engage the hook 20 with the peripheral portion 3A.

Further, the end piece 22 is slightly slanted in the –X direction in the first exemplary embodiment so that the free end 28 is positioned to be slightly closer to the base piece 21 with respect to the connection end 27. Accordingly, with the hook 20 is engaged with the peripheral portion 3A as depicted in FIG. 3, the free end 28 of the end piece 22 is pressed against the peripheral portion 3A to strengthen the engagement between the hook 20 and the peripheral portion 3A.

In the first exemplary embodiment, a Z-direction dimension of the base piece 21 from the connection end 25 connected to the connecting piece 23 to the free end 26 is defined as a dimension L1, a Z-direction dimension of the end piece 22 from the connection end 27 connected to the connecting piece 23 to the free end 28 is defined as a dimension L2, and a Z-direction dimension from a position of the free end 28 of the end piece 22 to the free end 26 of the base piece 21 is defined as a dimension L3. In the above arrangement, the dimension L1 is larger than the dimension L2 and a later-described base end 31 of the fixing portion 30 is located in a section corresponding to the dimension L3.

The fixing portion 30, the base end 31 of which is continuous with the base piece 21, protrudes in the –X direction with respect to the base piece 21. A leading end 32 of the fixing portion 30 opposite the base end 31 (i.e. an end at the side in the –X direction) includes a protrusion 33 in a form of an extension in the +Z direction and –Z direction. The length of the protrusion of the fixing portion 30 in the X direction is appropriately designed depending on the thickness of the cover material 4 so that the cover material 4 is placed between the base piece 21 and the protrusion 33.

As depicted in FIGS. 2 and 3, in the clip portions 11 adjoining in the Y direction, the connecting portion 12 serving as a part of each of the hooks 20 connects the connecting pieces 23.

The width dimension of each of the connecting portions 12 in the X direction, which is substantially the same as the dimension in the Y direction of each of the connecting pieces 23 in the first exemplary embodiment, is optionally larger or smaller than the dimension in the Y direction of each of the connecting pieces 23.

The length dimension of each of the connecting portions 12 in the Y direction, which is larger than the length dimension in the Y direction of each of the clip portions 11 in the first exemplary embodiment, is optionally smaller than or substantially the same as the dimension in the Y direction of each of the clip portions 11.

Attachment Process

An attachment process for attaching the cover material 4 onto the cover body 3 using the clip member 10 will be described below. It should be noted that a concave portion 3B dented in the –X direction is formed on an outer surface of the peripheral portion 3A of the cover body 3 at a position corresponding to the location for the clip portion 11 to be placed. Further, a hole 4A through which the fixing portion 30 is to be inserted is formed in a peripheral portion of the cover material 4.

Initially, the fixing portion 30 is inserted through the hole 4A of the cover material 4 so that the peripheral portion of the cover material 4 is positioned between the base piece 21 and the protrusion 33 to be fixed.

Next, as depicted in FIG. 4, after the free end 28 of the end piece 22 is placed in the concave portion 3B and brought into contact with the peripheral portion 3A, the clip portion 11, while being kept in contact with the peripheral portion 3A, is turned toward an inner backside of the cover body 3, as depicted in FIG. 5. The hook 20 is thus engaged with the peripheral portion 3A as depicted in FIG. 3, where the peripheral portion 3A is placed in the hooking groove 29, the base piece 21 and the end piece 22 are arranged along the peripheral portion 3A, and the connecting piece 23 and the connecting portion 12 are positioned along the edge of the peripheral portion 3A. At this time, the peripheral portion 3A can be suitably placed to reach the bottom of the hooking groove 29 by pushing the connecting portion 12 in the –Z direction.

With the hook 20 being engaged with the peripheral portion 3A as depicted in FIG. 5, the cover material 4 is pulled in the –Z direction by the fixing portion 30. At this time, the peripheral portion and a portion near the end piece 22 of the cover material 4 tend to return toward the +Z direction and –Z direction, respectively. However, since the base piece 21 is sized to have the dimension L1 and the base end 31 of the fixing portion 30 is located in the section corresponding to the dimension L3 as described above, the hook 20 is unlikely to be detached from the peripheral portion 3A. The pulled cover material 4 causes a force for putting the peripheral portion 3A deep into the hooking groove 29, thereby enhancing engagement of the hook 20. In addition, since the peripheral portion of the cover material 4 can be hooked on the protrusion 33 even when the cover material 4 is pulled, the cover material 4 is kept from being detached from the fixing portion 30. It should be noted that, while the hook 20 is engaged as depicted in FIG. 5, the free end 26 of the base piece 21 and the peripheral portion of the cover material 4 are located away in the X direction from a top plate surrounded by a flange of the cover body 3.

The cover material 4 is thus attached to the peripheral portion 3A of the cover body 3 using the clip member 10.

Advantage(s) of First Exemplary Embodiment

With the use of the clip member 10 according to the first exemplary embodiment, since the fixing portion 30, which protrudes from the base piece 21 and penetrates through the cover material 4, fixes the cover material 4, it is not necessary to attach the cover material 4 to the clip member 10 by sewing, so that the workload for the attachment work of the cover material 4 to the clip member 10 can be reduced. Further, with the hook 20 being engaged with the peripheral portion 3A of the cover body 3, the position of the cover material 4 fixed to the fixing portion 30 is mechanically determined, so that the cover material 4 can be attached to the peripheral portion 3A of the cover body 3 as desired. Further, the cover material 4 can be attached to the peripheral portion 3A of the cover body 3 by engaging the hook 20, which is provided with the end piece 22 at a side opposite the fixing portion 30, with the peripheral portion 3A of the cover body 3. Accordingly, it is not necessary to form a protrusion or the like, where the cover material 4 is attached, on the peripheral portion 3A itself of the cover body 3. In addition, with the use of the clip member 10, the protrusion 33 serves as a retainer of the cover material 4 and the base end 31 of the fixing portion 30 is provided between the position of the free end 26 of the base piece 21 and the position of the free end 28 of the end piece 22. Accordingly, the hook 20 is unlikely to be detached from the peripheral portion 3A of the cover body 3 and the workload required for the attachment work of the clip member 10 can be reduced by connecting two clip portions through the connecting portion. Further, By connecting the connecting pieces 23 of the clip portions 11 with the flexible connecting portion 12, the clip member 10 can be attached in a manner to follow the curved profile of the peripheral portion 3A of the cover body 3, excellent flexibility can be provided to the connecting portions 12, the hook 20 can be easily pushed into the peripheral portion 3A, and the cover material 4 can be kept from biting into between the connecting pieces 23 to be wrinkled, so that the appearance of the cover material 4 attached to the peripheral portion 3A of the cover body 3 can be improved.

Second Exemplary Embodiment

A second exemplary embodiment of the invention will be described below with reference to attached drawings.

Figure 6:
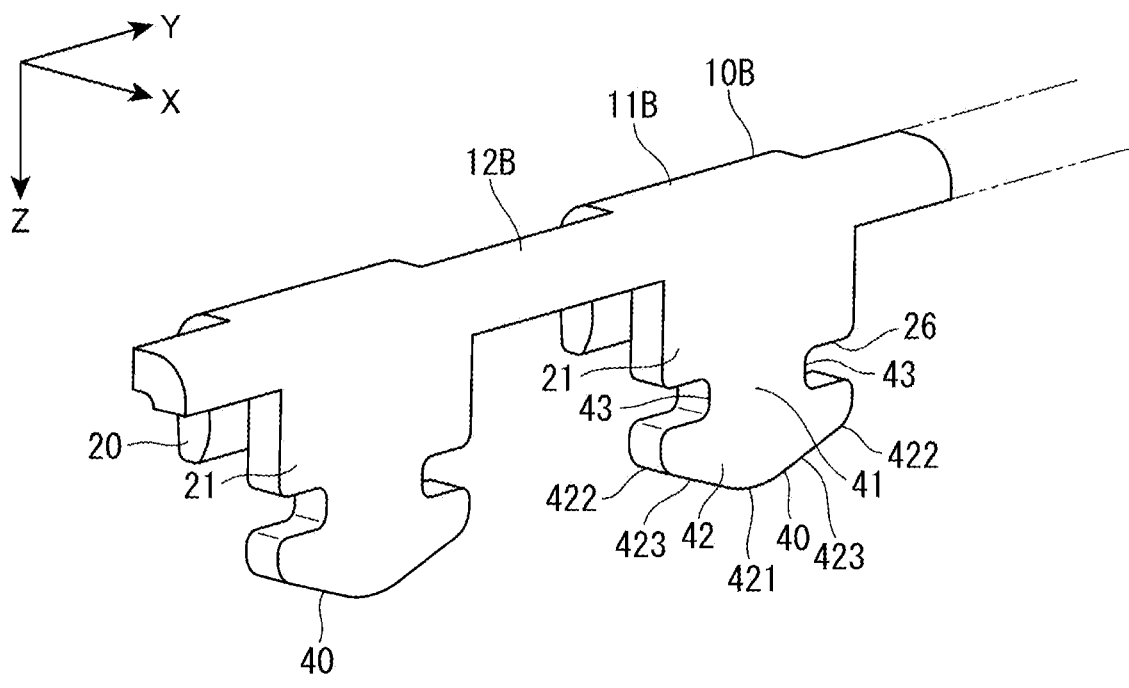
FIG. 6 is a perspective view depicting a clip member according to a second exemplary embodiment of the invention.
Figure 7:
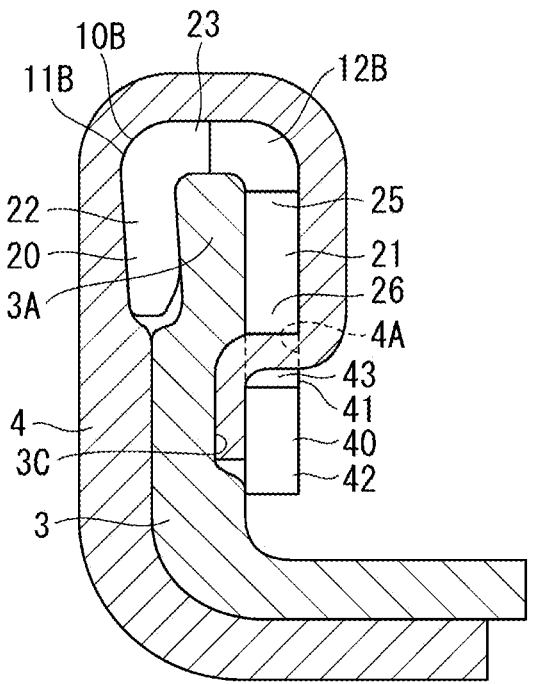
FIG. 7 is a cross-sectional view depicting the clip member according to the second exemplary embodiment.

A clip member 10B according to the second exemplary embodiment depicted in FIGS. 6 and 7 is usable in attaching the above-described cover material 4 (adherend) to the peripheral portion 3A of the above-described cover body 3 of the console box 2 (structural component) depicted in FIG. 1. The clip member 10B, which is a component made of a synthetic resin, includes a plurality of clip portions 11B and flexible connecting portions 12B integrally connecting the clip portions 11B in the Y direction. Each of the clip portions 11B includes the hook 20 described in the first exemplary embodiment and a fixing portion 40 that is different from the fixing portion 30 in the first exemplary embodiment. The connecting portions 12B, which are substantially the same as the connecting portions 12 in the first exemplary embodiment, are each provided between the plurality of clip portions 11B to connect the connection end 25 of the base piece 21 and a part of the connecting piece 23 near the base piece 21 in each of the clip portions 11B.

It should be noted that the X, Y, Z directions are the same as those described in the first exemplary embodiment. Further, components of the same or substantially the same structures as those of the first exemplary embodiment will be denoted by the same reference numerals in the drawings, omitting description thereof.

The fixing portion 40, which is configured to penetrate and fix the cover material 4, is a component extending from the base piece 21 in the −Z direction to be in a form of an arrowhead. The above-described free end 26 of the base piece 21 in the first exemplary embodiment is modified in the second exemplary embodiment into an integrally continuous end of the fixing portion 40. Further, the base piece 21 of the second exemplary embodiment is smaller in the Z-direction dimension than the base piece 21 of the first exemplary embodiment, where the above-described dimension L1 is defined by a sum of the Z-direction dimension of the base piece 21 and the Z-direction dimension of the fixing portion 40.

The fixing portion 40 includes a plate-shaped base 41 extending from a central portion (in the Y direction) of the end 26 of the base piece 21 in the −Z direction and a plate-shaped end portion 42 continuous with the base 41. The end 26 of the base 41, the base 41, and the end portion 42 define a pair of concave grooves 43 mutually facing in the Y direction. Each of the concave grooves 43 is defined by a pair of lateral portions in a form of the end 26 of the base piece 21 and the end portion 42 of the fixing portion 40 and a bottom portion in a form of the base 41 of the fixing portion 40.

The end portion 42 includes slant surfaces 423 slanting from a central portion 421 in the Y direction toward both ends 422 in the Y direction. Each of the slant surfaces 423 is slanted in the Z direction (i.e. in the +Z direction) from the central portion 421 toward corresponding one of the sides in the Y direction, so that the fixing portion 40 is more easily insertable into the hole 4A of the cover material 4. A Y-direction dimension of the end portion 42 (i.e. a width dimension of the end portion 42 itself) is larger than a Y-direction dimension of the base 41 (i.e. a width dimension of the base 41 itself). Further, the Y-direction dimension of the end portion 42 is the same as the Y-direction dimension of the base piece 21 (i.e. a width dimension of the base piece 21 itself). However, the Y-direction dimension of the end portion 42 may be, for instance, smaller than the Y-direction dimension of the base piece 21 to allow the end portion 42 to be more easily inserted, or larger than the Y-direction dimension of the base piece 21 to further restrain the cover material 4 from dropping off in the −Z direction as long as the fixing portion 40 is insertable into the hole 4A of the cover material 4.

It should be noted that a concave portion 3C depicted in FIG. 7 for an end of the cover material 4 to be placed with the fixing portion 40 inserted in the hole 4A is optionally provided in the peripheral portion 3A of the cover body 3 in the second exemplary embodiment.

Advantage(s) of Second Exemplary Embodiment

According to the second exemplary embodiment, the cover material 4 can be fitted into the pair of concave grooves 43 by the fixing portion 40 penetrating through the cover material 4, so that it is not necessary to attach the cover material 4 to the clip member 10B by sewing and, consequently, the workload for an attachment work of the cover material 4 on the clip member 10B can be reduced.

Further, as compared with an instance where the cover material 4 is attached to the clip member 10B by sewing, with the hook 20 being engaged with the peripheral portion 3A of the cover body 3, the position of the cover material 4 fixed to the fixing portion 40 is mechanically determined, so that the cover material 4 can be attached to the peripheral portion 3A as desired.

Further, the cover material 4 can be attached to the peripheral portion 3A of the cover body 3 by engaging the hook 20, which is provided with the end piece 22 at a side opposite the fixing portion 40, with the peripheral portion 3A. Accordingly, it is not necessary to form a protrusion or the like, where the cover material 4 is attached, on the peripheral portion 3A.

In addition, since the fixing portion 40 extends along the base piece 21, as compared with, for instance, the above-described fixing portion 30 protruding in the −X direction with respect to the base piece 21, the structure can be simplified by omitting the structure protruding in the −X direction and a possibility of interference of the clip member 10B with other components can be reduced.

In the second exemplary embodiment, the fixing portion 40 having the pair of concave grooves 43 may be in a form of an arrowhead.

The fixing portion 40 in a form of an arrowhead in the second exemplary embodiment can be more easily inserted into the cover material 4.

Third Exemplary Embodiment

A third exemplary embodiment of the invention will be described below with reference to attached drawings.

Figure 8:
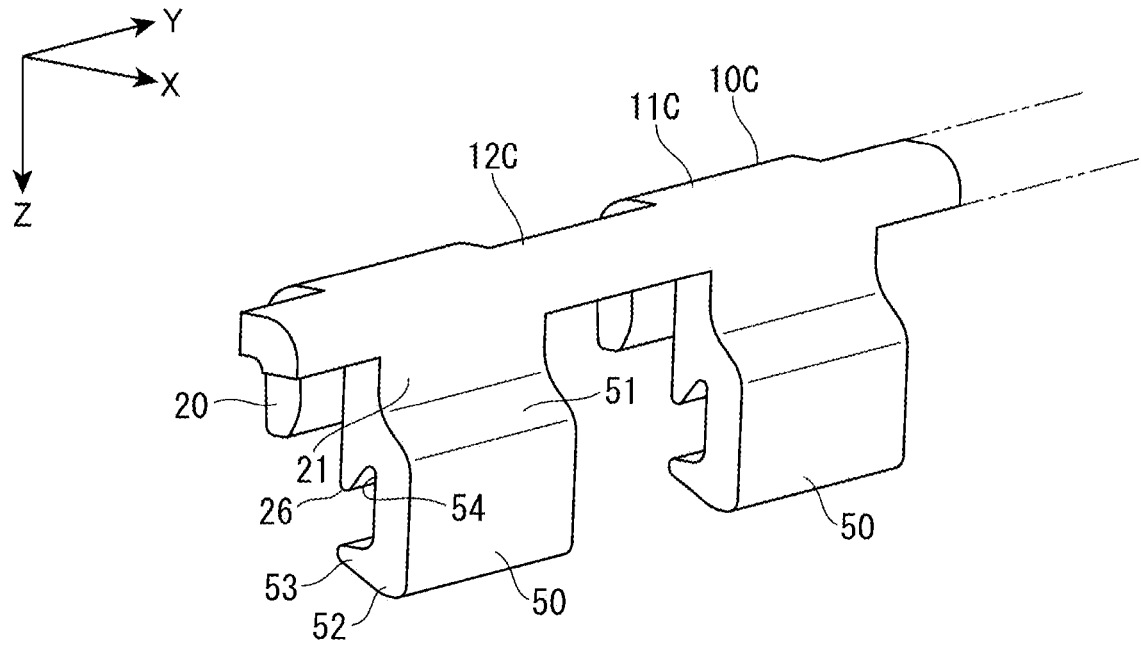
FIG. 8 is a perspective view depicting a clip member according to a third exemplary embodiment of the invention.
Figure 9:
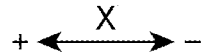
FIG. 9 is a cross-sectional view depicting the clip member according to the third exemplary embodiment.
Figure 9:
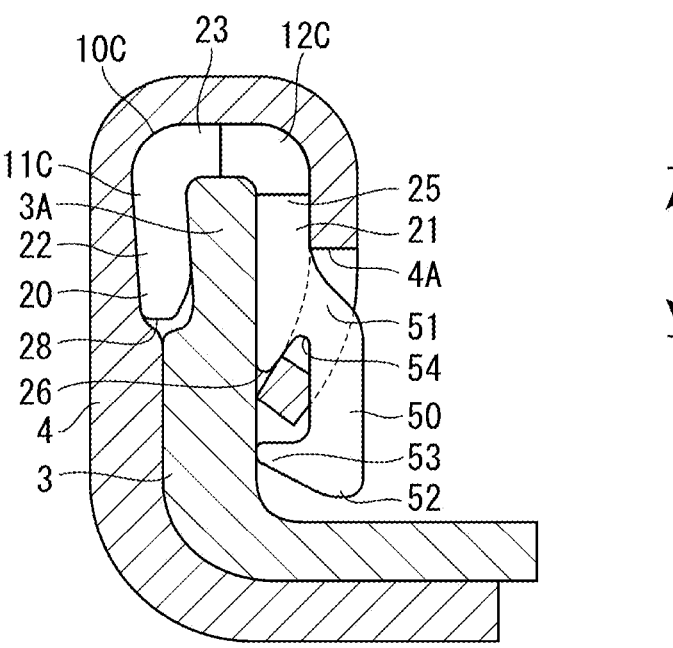

A clip member 10C according to the third exemplary embodiment depicted in FIGS. 8 and 9 is usable in attaching the above-described cover material 4 to the peripheral portion 3A of the above-described cover body 3 of the console box 2. The clip member 10C, which is a component made of a synthetic resin, includes a plurality of clip portions 11C spaced apart in the Y direction and flexible connecting portions 12C integrally connecting the clip portions 11C in the Y direction. Each of the clip portions 11C includes the hook 20 described in the first exemplary embodiment and a fixing portion 50 that is different from the fixing portion 30 in the first exemplary embodiment. The connecting portions 12C are configured in the same manner as the connecting portions 12B in the second exemplary embodiment.

It should be noted that the X, Y, Z directions are the same as those described in the first exemplary embodiment. Further, components of the same or substantially the same structures as those of the first exemplary embodiment will be denoted by the same reference numerals in the drawings, omitting description thereof.

The fixing portion 50 is configured to penetrate through the cover material 4 to fix the cover material 4. The fixing portion 50, which protrudes in the −X direction from a part of the base piece 21 near the free end 26, is provided with a retainer claw 53 at a leading end 52 of the fixing portion 50. The base piece 21 of the third exemplary embodiment is smaller in the Z-direction dimension than the base piece 21 of the first exemplary embodiment, where the above-described dimension L1 is defined by a sum of the Z-direction dimension of the base piece 21 and the Z-direction dimension of the fixing portion 50. A base end 51 of the fixing portion 50 is continuous with the base piece 21. The retainer claw 53 is disposed to face the free end 26 of the base piece 21 in the Z direction in a manner spaced apart from each other. A step portion is formed between the free end 26 and the base end 51. The step portion is defined as a concave portion 54 tapered from an opening to a bottom thereof. Accordingly, when the cover material 4 is attached to the peripheral portion 3A of the cover body 3, the cover material 4 is fitted into the concave portion 54 as depicted in FIG. 9, so that an end of the cover material 4 is unlikely to be misaligned or dropped off. With the fixing portion 50 being inserted in the hole 4A, the retainer claw 53 prevents the cover material 4 from being detached from the fixing portion 50 before the cover material 4 is attached to the peripheral portion 3A. It should be noted that the concave portion 54, which is designed in any manner as long as the end of the cover material 4 is placeable in the concave portion 54, is not necessarily tapered as described above.

Advantage(s) of Third Exemplary Embodiment

According to the third exemplary embodiment, the above-described advantages of the first exemplary embodiment can be achieved. In addition, when the fixing portion 50 penetrates through the hole 4A of the cover material 4, the cover material 4 is hooked to be received in the concave portion 54 (step portion). Accordingly, even when the engagement of the cover material 4 is loosened, the cover material 4 can be prevented from being detached from the fixing portion 50 by the presence of the retainer claw 53 engaged with the cover material 4. While the cover material 4 is attached to the peripheral portion 3A of the cover body 3, since the free end 26 of the base piece 21 and the retainer claw 53 of the fixing portion 50 are arranged along the peripheral portion 3A with the cover material 4 being hooked to be received in the concave portion 54, the cover material 4 is fixed by the fixing portion 50 and kept fixed.

According to the third exemplary embodiment, as compared with a clip member having, for instance, a simple flat step portion formed between the free end 26 of the base piece 21 and the base end 51 of the fixing portion 50, the position of the cover material 4 can be restrained from being shifted since the cover material 4 is placed in the concave portion 54.

According to the third exemplary embodiment, when a tensile force is applied on the cover material 4 after the cover material 4 is attached to the peripheral portion 3A, the cover material 4 is fitted into the tapered concave portion 54. Accordingly, the position of the cover material 4 is further unlikely to be shifted and also is unlikely to be dropped off from the fixing portion 50.

Fourth Exemplary Embodiment

A fourth exemplary embodiment of the invention will be described below with reference to attached drawings.

Figure 10:
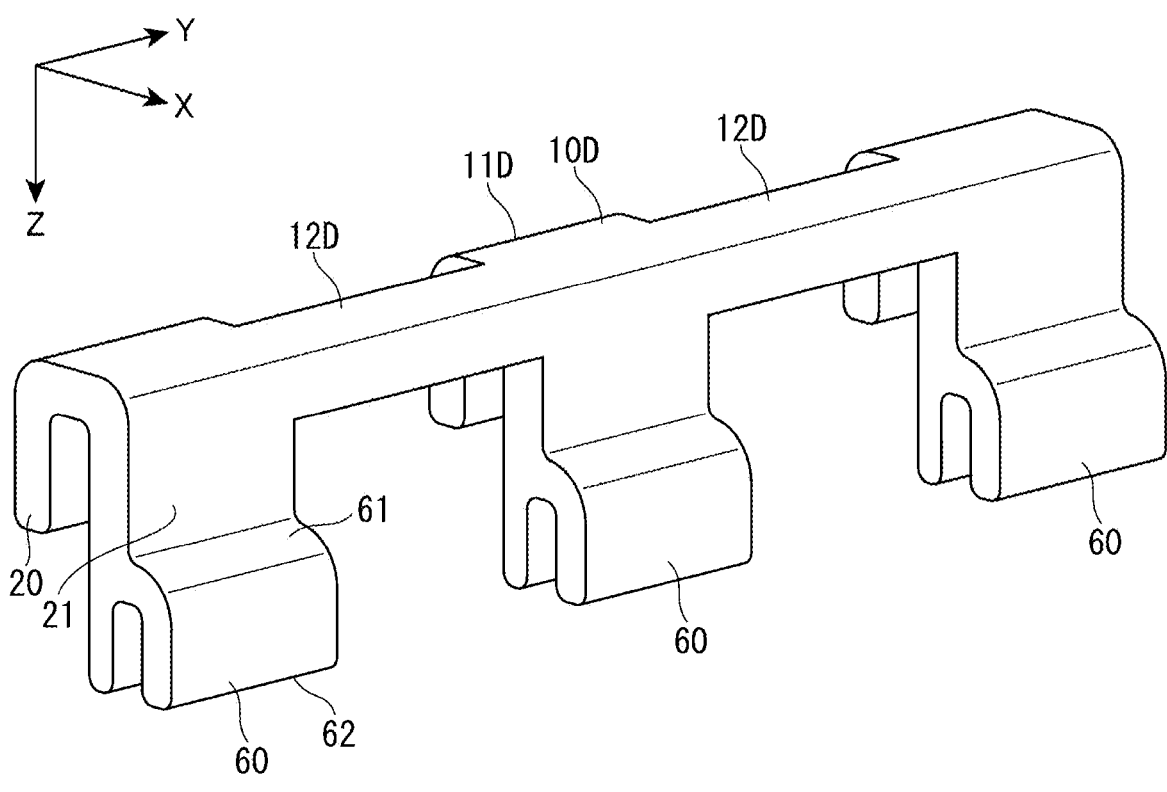
FIG. 10 is a perspective view depicting a clip member according to a fourth exemplary embodiment of the invention.
Figure 11:
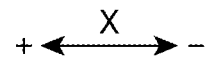
FIG. 11 is a cross-sectional view depicting the clip member according to the fourth exemplary embodiment.
Figure 11:
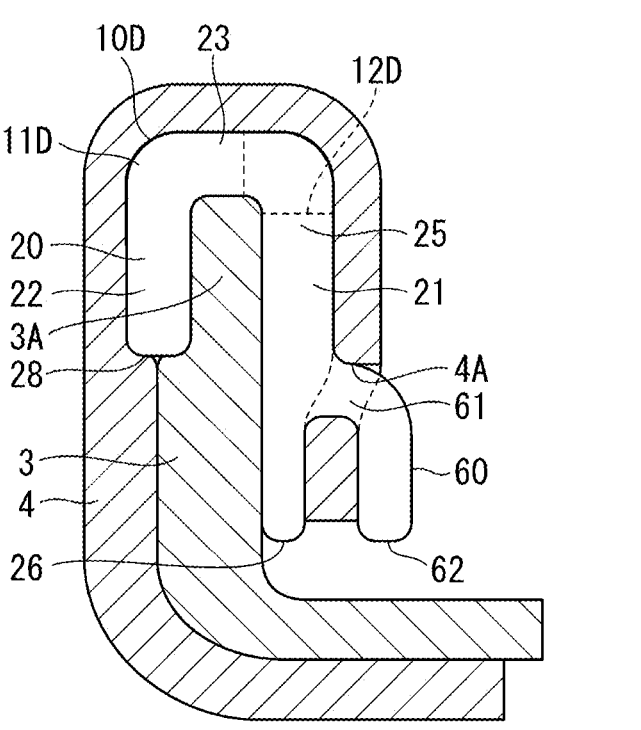

A clip member 10D according to the third exemplary embodiment depicted in FIGS. 10 and 11 is usable in attaching the above-described cover material 4 to the peripheral portion 3A of the above-described cover body 4 of the console box 2. The clip member 10D, which is a component made of a synthetic resin, includes a plurality of clip portions 11D spaced apart in the Y direction and flexible connecting portions 12D integrally connecting the clip portions 11D in the Y direction. Each of the clip portions 11D includes the hook 20 described in the first exemplary embodiment and a fixing portion 60 that is different from the fixing portion 30 in the first exemplary embodiment. The connecting portions 12D are configured in the same manner as the connecting portions 12B in the second exemplary embodiment.

It should be noted that the X, Y, Z directions are the same as those described in the first exemplary embodiment. Further, components of the same or substantially the same structures as those of the first exemplary embodiment will be denoted by the same reference numerals in the drawings, omitting description thereof.

The fixing portion 60 is configured to penetrate through the cover material 4 to fix the cover material 4. The fixing portion 60, a base end 61 of which is continuous with the base piece 21, protrudes in the −X direction with respect to the base piece 21 and extends in the −Z direction, where a part of the fixing portion 60 near a leading end 62 with respect to the base end 61 faces the base piece 21 in a manner spaced in a direction (i.e. X direction) orthogonal to the direction along the base piece 21 (Z direction). It should be noted that the part of the base piece 21 facing the fixing portion 60 in the X direction is thinner than other parts of the base piece 21 in the fourth exemplary embodiment. The fixing portion 60 is configured so that, once being inserted through the hole 4A of the cover material 4, an end of the cover material 4 is hooked to the base end 61 and is held between the base piece 21 and the part of the fixing portion 60 near the leading end 62 with respect to the base end 61.

Advantage(s) of Fourth Exemplary Embodiment

According to the fourth exemplary embodiment, when the fixing portion 60 is inserted through the hole 4A of the cover material 4, the cover material 4 is hooked to the base end 61 of the fixing portion 60 and is held between the fixing portion 60 and the base piece 21. Thus, the cover material 4, which is kept being hooked to the base end 61 of the fixing portion 60, is firmly fixed (and kept being fixed) to the fixing portion 60 once being applied with a tensile force after the cover material 4 is attached to the peripheral portion 3A of the cover body 3.

According to the fourth exemplary embodiment, the fixing portion 60 can be provided close to the base piece 21, so that the size of the clip member 10D can be reduced and, consequently, the possibility of interference with other components can be reduced.

Modifications

Figure 12A:
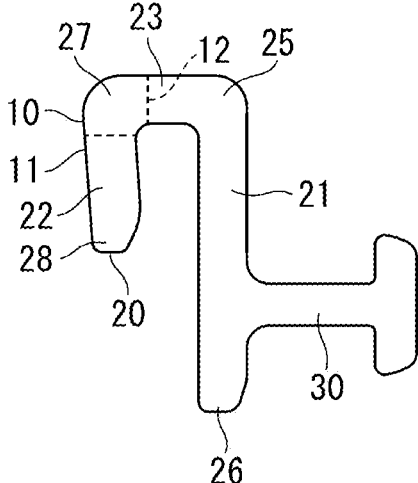
FIG. 12A is a cross-sectional view depicting a modification of a first clip member.

The connecting portions 12, which connect the connecting pieces 23 in the first exemplary embodiment, alternatively connect, for instance, the connection ends 27 of the end pieces 22 as in a modification depicted in FIG. 12A. According to the above arrangement, as compared with the exemplary embodiment where the connecting pieces 23 are connected by the connecting portions 12, an appropriate hardness can be provided to the connecting portions 12, so that the end pieces 22 are not easily bent toward each other while the base pieces 21 of the clip portion 11 are easily bent toward each other. In addition, the cover material 4 can be kept from biting into between the connection ends 27 to be wrinkled, thereby improving the appearance of the cover material 4 attached to the peripheral portion 3A of the cover body 3.

The above arrangement is also optionally applied to the connecting portions 12B, 12C, 12D of the second, third and fourth exemplary embodiments.

Figure 12B:
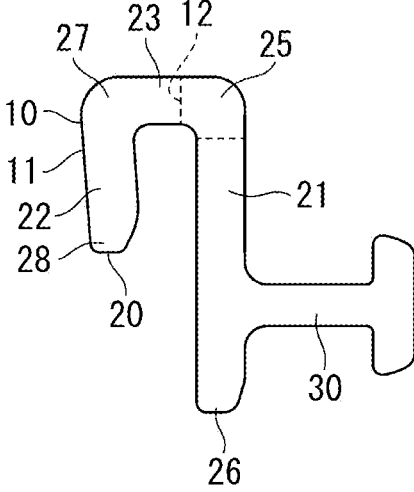
FIG. 12B is a cross-sectional view depicting another modification of the first clip member.

The connecting portions 12, which connect the connecting pieces 23 in the first exemplary embodiment, alternatively connect, for instance, the connection ends 25 of the base pieces 21 as in a modification depicted in FIG. 12B. In the above arrangement, as compared with the exemplary embodiment where the connecting pieces 23 are connected by the connecting portions 12, an appropriate hardness can be provided to the connecting portions 12, so that the base pieces 21 are not easily bent toward each other while the end pieces 22 of the clip portion 11 are easily bent toward each other. In addition, the cover material 4 can be kept from biting into between the connection ends 25 to be wrinkled, thereby improving the appearance of the cover material 4 attached to the peripheral portion 3A of the cover body 3.

The above arrangement is also optionally applied to the connecting portions 12B, 12C, 12D of the second, third and fourth exemplary embodiments.

The protrusion 33, which is formed as an extension at the leading end 32 of the fixing portion 30 in the first exemplary embodiment, is optionally omitted as long a the cover material 4 is kept from dropping off without the protrusion 33.

The dimension L1, which is larger than the dimension L2 in the first to fourth exemplary embodiments as depicted in FIG. 3, is optionally equal to or less than the dimension L2 as long as the hook 20 can be kept being engaged with the peripheral portion 3A. In this case, the dimension L3 cannot be defined, where the fixing portions 30, 40, 50, 60 are continuous with the base piece 21 in the section corresponding to the dimension L1.

The fixing portions 30, 40, 50, 60, which are continuous with the base piece 21 in the section corresponding to the dimension L3 in the first to fourth exemplary embodiments, are optionally continuous with the base piece 21 in the section corresponding to the dimension L2 even when the dimension L1 remains larger than the dimension L2.

The clip members 10, 10B, 10C, 10D, which include the respective connecting portions 12, 12B, 12C, 12D connecting the plurality of clip portions 11 in the first to fourth exemplary embodiments, are each optionally configured as a single component of the clip portion 11 without including the connecting portions 12, 12B, 12C, 12D.

The structural component is exemplarily the cover body 3 of the console box 2 in the description of the first to fourth exemplary embodiments. However, the structural component is optionally an instrumental panel in an interior of an automobile, where the clip members 10, 10B, 10C, 10D are attached to the peripheral portion of the structural component.

The invention claimed is:

1. A clip member comprising:
a hook engageable with a peripheral portion of a structural component; and
a fixing portion configured to penetrate through a cover material to fix the cover material, the clip member being configured to attach the cover material to a flange-shaped edge portion forming the peripheral portion of the structural component,
wherein:
the hook comprises a base piece, an end piece provided at a first side with respect to the base piece, and a connecting piece connecting the base piece and the end piece,
the fixing portion comprises a base end continuous with the base piece and protrudes toward a second side with respect to the base piece,
the base end of the fixing portion protrudes toward the second side from the base piece, and the fixing portion extends along the base piece from the base end,
the base end of the fixing portion and a free end of the base piece define therebetween a step portion in which the cover material is placeable, and
the fixing portion further comprises: a leading end extending along the base piece; and a retainer claw provided at the leading end, the retainer claw protruding toward the first side, and facing the free end of the base piece in a manner spaced apart from the free end in a direction along the base piece defined as a Z direction.

2. The clip member according to claim 1, wherein the step portion comprises a concave portion defined between the base end of the fixing portion and the free end of the base piece.

3. The clip member according to claim 2, wherein the concave portion is tapered from an opening to a bottom thereof.

4. The clip member according to claim 1, further comprising:
at least two clip portions, each comprising the hook and the fixing portion; and
a flexible connecting portion connecting the at least two clip portions,
wherein the connecting portion connects parts of the hooks of the at least two clip portions.

5. The clip member according to claim 4, wherein the connecting portion connects the connecting pieces of the hooks of the at least two clip portions.

6. The clip member according to claim 4, wherein the connecting portion
connects connection ends of the respective base pieces connected to the connecting pieces of the hooks of the at least two clip portions or
connects connection ends of the respective end pieces connected to the connecting pieces of the hooks of the at least two clip portions.

7. A clip member comprising:

a hook engageable with a peripheral portion of a structural component;

a fixing portion configured to penetrate through a cover material to fix the cover material, the clip member being configured to attach the cover material to a flange-shaped edge portion forming the peripheral portion of the structural component;

at least two clip portions, each comprising the hook and the fixing portion; and a flexible connecting portion connecting the at least two clip portions, wherein:

the hook comprises a base piece, an end piece provided at a first side with respect to the base piece, and a connecting piece connecting the base piece and the end piece, the fixing portion comprises a base end continuous with the base piece and protrudes toward a second side with respect to the base piece, and wherein the connecting portion connects parts of the hooks of the at least two clip portions.

8. The clip member according to claim 7, wherein the connecting portion connects the connecting pieces of the hooks of the at least two clip portions.

9. The clip member according to claim 7, wherein the connecting portion connects connection ends of the respective base pieces connected to the connecting pieces of the hooks of the at least two clip portions or connects connection ends of the respective end pieces connected to the connecting pieces of the hooks of the at least two clip portions.

* * * * *